United States Patent [19]

Kuzuwata et al.

[11] 4,208,212

[45] Jun. 17, 1980

[54] AQUEOUS TREATING LIQUID FOR USE IN OFFSET PRINTING

[75] Inventors: Masayuki Kuzuwata, Yokohama; Hazime Machida, Tokyo; Hiroshi Tamura, Fujisawa; Tadashi Saito, Yokohama, all of Japan

[73] Assignee: Ricoh Co., Ltd., Tokyo, Japan

[21] Appl. No.: 878,400

[22] Filed: Feb. 16, 1978

[30] Foreign Application Priority Data

Feb. 22, 1977 [JP] Japan ................................ 52/18568

[51] Int. Cl.$^2$ ................................................ C09K 3/18

[52] U.S. Cl. ....................................... 106/2; 101/465; 101/467; 148/6.15 R

[58] Field of Search .................... 423/351, 593; 106/2, 106/21; 101/465; 148/6.15 R

[56] References Cited

U.S. PATENT DOCUMENTS

| | | | |
|---|---|---|---|
| 1,402,442 | 1/1922 | Porter | 106/21 |
| 3,399,994 | 3/1968 | Watkinson | 101/465 |
| 3,726,823 | 4/1973 | Morishima et al. | 101/465 |

OTHER PUBLICATIONS

"Chemical Principles", Second Edition, Masterton et al., p. 498, W. B. Saunders, Phila.

*Primary Examiner*—J. Ziegler

*Attorney, Agent, or Firm*—Blanchard, Flynn, Thiel, Boutell & Tanis

[57] ABSTRACT

The present invention is intended to provide a cyanless treating liquid for use in offset printing which has an intense desensitizability, is capable of rapidly forming a firm hydrophilic film, is free from deterioration of the efficiency thereof when subjected to light or heat, and poses no problem of public nuisance.

4 Claims, No Drawings

AQUEOUS TREATING LIQUID FOR USE IN OFFSET PRINTING

BACKGROUND OF THE INVENTION (a) Field of the Invention

The present invention relates to an aqueous treating liquid for use in the desensitizng treatment of various offset printing plates.

At present, as offset printing plates, there are known an electrophotographic plate which is provided with a photo-sensitive layer formed by dispersing inorganic photoconductive particles, such as zinc oxide particles, in a resinous binder and it is intended to form an hydrophobic image thereon by an electrophotographic process, a direct image-printing plate which is provided with an image-accepting layer formed by dispersing an inorganic pigment, such as titanium oxide, in a resinous binder and it is intended to form an image on said layer by directly writing thereon with oily ink or typewriting, a P S plate which is provided with a photosensitive layer consisting of a photohardening resin on an aluminum plate with a coarsened surface and it is intended to form an image by utilizing the difference between the solubility of the exposed area and that of the non-exposed area of said photosensitive layer, and so forth. All of these plates are usually made into an offset master by forming an oleophilic image thereon and then subjecting same to a desensitizng treatment for making the non-image area of the plate hydrophilic. The treating liquid for use in this desensitizing treatment can be broadly divided into 3 kinds: one which consists essentially of a hydrophilic resin such as gum arabic and polyvinyl pyrrolidone or at least one member selected from the group consisting of phosphate, aluminum-alum compound and acid (inorganic or organic), one which consists essentially of a ferrocyanide or ferricyanide proposed in U.S. Pat. No. 3,001,872, and one which comprises phytic acid or a metal seal of phytic acid disclosed in Japanese Patent Publication No. 24609/1970 and Japanese Patent Open No. 103501/1976. However, these treating liquids leave something to be desired for use, as a satisfactory treating liquid. To be concrete, the first treating liquid is not capable of forming a hydrophilic film having a high physical strength on the non-image area and its film-forming speed is low, and accordingly, when an offset master treated with such an aqueous liquid is employed for printing, the master and the resulting prints develop stains of gearstripe (upon suddenly rotating a printing cylinder at the beginning of offset printing, a blanket cylinder rubs the surface of an offset master thereby to deteriorate the desensitized surface of the same with printing stains.), stains on the ground and collapse of the image upon turning out prints in small quantities, so that it is not of practical use. The second processing liquid, as compared with the first treating liquid, has such merits that it is superior in desensitizability and the physical strength of the hydrophilic film formed thereof is high and the film-forming speed is high. However, it is defective in that it becomes colored when subjected to light or heat, or it gives rise to precipitates while in use or in storage, thereby making the desensitizability thereof unstable. Not only that, as it contains cyan ions, it is undesirable from the view point of public nuisance. And, the third processing liquid is defective in that it is unsatisfactory in respect of desensitizability, and it gives rise to precipitates with the passing of time, thereby causing deterioration of the desensitizability thereof.

SUMMARY OF THE INVENTION

The present invention is intended to provide a cyanless treating liquid for use in offset printing which has an intense desensitizability, is capable of rapidly forming a firm hydrophilic film, is free from deterioration of the efficiency thereof when subjected to light or heat, and poses no problem of public nuisance.

The present invention is also intended to provide a practical treating liquid for use in offset printing which is so superior in durability in printing that there occur no stains of gear-stripe, stains on the ground or collapse of the image on the offset master or prints even in turning out a lot of prints.

The present invention relates to an aqueous treating liquid for use in offset printing, whch comprises at least one member selected from the group consisting of compounds expressed by the general formula I$[M(X_1)a](Y)$-$b{\cdot}cH_2O$ (wherein M represents a metal of divalence or more, $X_1$ represents $NH_3$, $OH_2$, $H_2N(CH_2)_2NH_2$, $C_2O_4$, NO, $NO_2$, OCHO, $NH_2$, $HONC(CH_3)C$, $(CH_3)NO$,

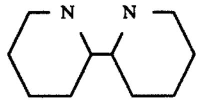
,
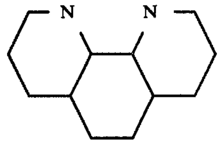
, $OCN_2H_4$ or $OC(NH_2)_2$, Y represents anion, a is a number ranging from 2 to 6, b is a number ranging from 1 to 3, and c is 0 or a number ranging from 1 to 10), compounds expressed by the general formula II $[M(X_1)a'(X$-$_2)a''](Y)b{\cdot}cH_2O$ (wherein M, $X_1$, Y, b and c are respectively the same as that in the general formula I, $X_2$ represents OH, $OH_2$, $NO_2$, $CO_3$, $NH_2CH_2COO$, $HONC(CH_3)$—$C(CH_3)NO$, Br, Cl, $H_2N(CH_2)_2NH_2$, $ONO_2$, ONO, NCS, $H_2O$, N,

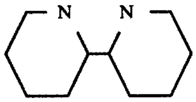
,
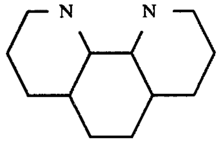
,

F or I, and a' and a'' are respectively a number ranging from 1 to 5), compounds expressed by the general formula III $(M_1)p[(M_2)(X_3)q]{\cdot}nH_2O$ (wherein $M_1$ represents Na, K, $NH_4$ or hydrogen atom, $M_2$ represents a metal of divalence or more, $X_3$ represents $C_2O_4$, $NO_2$, Cl, Br, I or

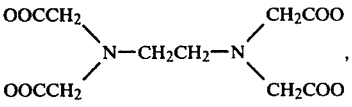
, p is a number ranging from 1 to 3, q is a number ranging from 1 to 6, and n is 0 or a number ranging from 1 to 10), compounds expressed by the general formula IV $(M_1)p[(M_2)(X_3)q(X_4r]{\cdot}nH_2O$ (wherein $M_1$, $M_2$, $X_3$, p, q and n are respectively the same as that in the general formula III, $X_4$ represents $NH_3$ or $NH_2CH_2CH_2NH_2$, and r is a number ranging from 1 to 6) and compounds expressed by the general formula V $(M_1)p[(M_2)(X_3)q(X_4)r(X_5)s]\cdot nH_2O$ (wherein $M_1$, $M_2$, $X_3$, p, q and n are respectively the same as that in the general formula III, $X_4$ and r are respectively the same as that in the general formula IV, $X_5$ represents $C_2O_4$, $NO_2$, Cl or Br, s is a number ranging from 1 to 6). In short, the present invention relates to an aqueous treating liquid comprising at least one member selected from compounds expressed by the general formula I, compounds expressed by the general formula II, compounds expressed by the general formula III, compounds expressed by the general formula IV or compounds expressed by the general formula V.

In this context, to give concrete examples of M or $M_2$ in the general formulas I through V, there are Zn, Ir, Co, Ti, Fe, Cu, Ni, Pt, Mn, Ru, Rh, Hf, V, Be, etc., and to give concrete examples of Y in the general formulas I and II, there are I, Br, Cl, $Cl_3$, $Cl_4$, $C_2O_4$, $SO_4$, $NO_3$, $NO_2$, $CH_3$, COO, HCOO, BFhd 4, $MnO_4$, OH, F, $HSO_4$, $HPO_4$, $PO_4$, $HPO_3$, $SO_4X$ (wherein X represents Cl, Br, I, $ClO_4$ or $NO_3$), etc.

Complexes useful for the present invention which are expressed by the foregoing general formulas form a desensitizing salt which is very firm, stable and hard to dissolve in water in the presence of metal ions. Moreover, these complexes are stable against light and heat and, accordingly, are not only free from deterioration of the desensitizability thereof with the passing of time but also capable of forming a desensitizing film which is firmer and stabler than that formed of any cyan compound. Besides, inasmuch as these complexes contain no cyan ions, they pose no problem of public nuisance. Further, while cyan compounds display desensitization effect only in the acid region, complexes according to the present invention display desensitization effect in a wide range extending from acid region to alkaline region.

To give concrete examples of compounds expressed by the foregoing general formulas I and II, there are hexamine cobalt salt like $[Co(NH_3)_6]Cl_3$ and $[Fe(NH_3)_6]I_2$, $[Ti(NH_3)_4Cl_2]Cl$, $[Mn(NH_3)_6]Cl_2$, $[Co(NH_3)_5H_2O]Br_3$, $[Ru(NH_3)_6](SO_4)_{1.5}\cdot 2.5H_2O$, $\{Cu[H_2N(CH_2)_2NH_2]_3\}Cl_3$, $[Pt(NH_3)_6](OH)_4$, $[Ni(NH_3)_6](ClO_3)_2$, $[Co(NH_3)_4Cl_2]Cl$, $[Fe(NH_3)_5NO_2]Cl_2$, $[Co(NH_3)_5(OH_2)](C_2O_4)_{1.5}.2H_2O$, $[Ni(NH_3)_6](ClO_3)_2$, $[Co(NH_3)_4(NO_2)_2]Cl$, $[Mn(NH_3)_6]Cl_3$, $[Fe(NH_3)_6]I_2$, etc. And, to give concrete examples of compounds expressed by the general formulas III through V, there are $K[Co(NH_3)_2(NO_2)_4]$, $Na[Co(NH_3)_2(NO_2)_4]$, $NH_4[Co(NH_3)_2(NO_2)_4]$, $K[Co(NH_3)_2(NO_2)_2(C_2O_4)].H_2O$, $Na[Co(NH_3)_2(NO_2)_2(C_2O_4)].H_2O$, $NH_4[Co(NH_3)_2(NO_2)_2(C_2O_4)].H_2O$, $Na_3[Co(C_2O_4)_3]$, $(NH_4)_3[Co(C_2O_4)_3]$, $K_3[Co(C_2O_4)_3]$, $Na_3[Co(NO_2)_6]$, $(NH_4)_3[Co(NO_2)_6]$, K[Co(edta)], Na[Co(edta)], $(NH_4)$ [Co(edta)], $K_3[CoCl_6]$, $Na_3[CoCl_6]$, $(NH_4)_3[CoCl_6]$, $K_3[CoBr_6]$, $Na_3[CoBr_6]$, $(NH_4)_3[CoBr_6]$, $K[Co(NH_2CH_2CH_2NH_2)(NO_2)_4]$, $Na[Co(NH_2CH_2CH_2NH_2)(NO_2)_4]$, $K[Co(NH_2CH_2CH_2NH_2)_2(NO_2)_2]$, $Na[Co(NH_2CH_2CH_2NH_2)_2(NO_2)_2]$, $NH_4[Co(NH_2CH_2CH_2NH_2)_2(NO_2)_2]$, $K_3[Ni(C_2O_4)_3]$, $Na_3[Ni(C_2O_4)_3]$, $(NH_4)_3[Ni(NO_2)_6]$, $K_2$[Ni(edta)], $Na_2$[Ni(edta)], $(NH_4)_2$[Ni(edta)], $K_2$[Fe(edta)], Na[Fe(edta)], $(NH_4)$[Fe(edta)], $K_3[Fe(C_2O_4)_3]$, $Na_3[Fe(C_2O_4)_3]$, $(NH_4)_3[Fe(C_2O_4)_3]$, $Pt[Pt(NH_3)_4Cl_2]$, $H_2[PtCl_6]$, $K_2[PtCl_6]$, $K_2[PtI_6]$, $H_2[Pt(NO_2)_4]$, $NH_4[Co(NH_2CH_2CH_2NH_2)(NO_2)_4]$, $K_2[Pt(NO_2)_4]$, $Na_2(Pt(NO_2)_4]$, $K_2[Pt(C_2O_4)_2]$, $Na_2[Pt(C_2O_4)_2]$, $(NH_4)_2[Pt(C_2O_4)_2]$, $K_2[Pd(NO_2)_4]$, $Na_2[Pd(NO_2)_4]$, $(NH_4)_2[Pd(NO_2)_4]$, $K_2[Pd(C_2O_4)_2]$, $Na_2[Pd(C_2O_4)_2]$, $(NH_4)_2[Pd(C_2O_4)_2]$, $NH_4[Co(NH_3)_2(C_2O_4)(NH_2CH_2CH_2NH_2)]$, $Na[Co(NH_3)_2(C_2O_4)(NO_2)_2]$, $NH_3[Co(NH_3)_2(C_2O_4)(NO_2)_2]$, etc. In this context, "edta" is an abbreviation of ethylene diamine tetraacetic acid radical

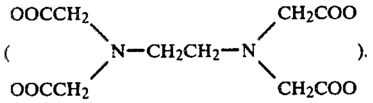

These complexes are easily obtained through the known synthesizing process or available on the market. For use in the present invention, among the foregoing compounds, hexamine cobalt salt is especially desirable.

The compounds expressed by the general formulas I through V can be admixed with those substances which are generally employed as assistants to processing liquids. These assistants include, for instance, phosphate, alkali, ammonia, organic salt, amine, etc. as base; fatty acid, aromatic oxycarboxylic acid, inorganic acid (e.g., phosphoric acid) as acid; sulfate, nitrate, etc. as metallic salt; glycerine, alcohol, glycol, natural or synthetic hydrophilic polymer, etc. as wetting agent; aminocarboxylic acid, polyphosphoric acid as antioxidant; and dehydroacetic acid, salicylic acid, etc. as antiseptics. Among these assistants, application of base and/or inorganic acid, especially phosphate and/or phosphoric acid, is desirable.

As will be understood from the foregoing descriptions, a preferable embodiment of the present invention is an aqueous treating liquid comprising hexamine cobalt salt and phosphate and/or phosphoric acid. To be more precise, this processing liquid has an excellent durability in printing, that is, it brings on no stains of gear-stripe or stains on the ground on the offset masters or prints even when used in producing a lot of prints. Hexamine compounds as set forth above are complexes having an isometric octahedral coordination structure. This coordination structure is akin to that of hexacyano compounds such as ferrocyanides, etc. Therefore, hexamine compounds form a very firm and stable desensitizing complex which is hard to dissolve in water upon reacting with metallic ions. Not only that, hexamine compounds are stable against heat and light unlike hexacyano compounds and, accordingly, they are free from deterioration of the desensitizability with the passing of time and capable of forming a desensitizing film which is firmer and stabler than that formed of hexacyano compounds. Besides, while hexacyano compounds display a desensitizing effect only in an acid region, hexamine compounds display that effect in a wide range covering the acid region and alkaline region. Moreover, a desensitizing film (salt) formed of a hexamine compound alone has a sufficient water-holding property (this water-holding property, or the degree of getting wet with water, is expressed by the contact angle between the film and water, and it is considered that the narrower is this contact angle, the better is the water-holding property; in the case of the desensitizing salt of hexamine compound, this contact angle is about 45°), entailing a satisfactory ink-separating property. In the preferable embodiments of the present invention, for the sake of further enhancement of this water-holding property of the desensitizing salt, phosphoric acid and- /or phosphate employed jointly with hexamine compounds. In this connection, phosphoric acid or phosphate is admittedly poor in desensitizability as described above when employed independently, but it can form a desensitizing salt having a satisfactory water-holding property (contact angle for water: about 15°) upon reacting with metal ions. On this occasion, the hexamine compound is combined with phosphoric acid and/or phosphate within an aqueous solution and assumes a structure wherein phosphoric acid ions are coordinated on the outside of complex ions. For instance, in the case where $[Co(NH_3)_6]Cl_3$ is combined with $Na_2HPO_4$, the hexamine compound assumes the structure $\{[Co(NH_3)_6](HPO_4)_4\}^{5-}$, and this forms a desensitizing salt upon reacting with metal ions. Because the hexamine compound thus forms a desensitizing film which contains $HPO_4^-$ having a satisfactory water-holding property in the presence of phosphoric acid (or phosphate), the ink-separating property thereof is very much improved.

As examples of hexamine cobalt salt, in addition to the foregoing $[Co(NH_3)_6]Cl_3$, there can be cited $[Co(NH_3)_6](HPO_4)_3.4H_2O$, $[Co(NH_3)_6]PO_4.4H_2O$, $[Co(NH_3)_6].(ClO_4)_3$, $[Co(NH_3)_6](OH)_3.6H_2O$, $[Co(NH_3)_6]F_3$, $[Co(NH_3)_6](CF_3COO)_3$, $[Co(NH_3)_6](CCl_3COO)_3$ $[Co(NH_3)_6](ClO_3)_3$, $[Co(NH_3)_6]SO_4Cl$, $[Co(NH_3)_6](TiCl_6)$, $[Co(NH_3)_6](BiCl_6)$, etc.

As phosphoric acid or phosphate, phosphoric acid, metaphosphoric acid, hexaphosphoric acid, trimetaphosphoric acid, dodecaoxo-6-phosphoric acid, hypophosphoric acid, monoammonium phosphate, diammonium phosphate, triammonium phosphate, monosodium phosphate, disodium phosphate, trisodium phosphate, monopotassium phosphate, dipotassium phosphate, tripotassium phosphate, phosphomolybdic acid, sodium pyrophosphate, ammonium phosphomolybdate, monocalcium phosphate, monomagnesium phosphate, sodium ammonium phosphate, imidometaphosphoric acid, calcium pyrophosphate, etc. are useful.

The appropriate amount of these phosphoric acids and/or phosphates to be employed is in the range of from 0.1 to 20 parts by weight, preferably from 1 to 5 parts by weight, per 1 part by weight of hexamine cobalt salt.

The treating liquid of the present invention is applied to the surface of various conventional offset printing plates, such as electrophotographic printing plate, direct image-printing plate, P S printing plate, etc. at a concentration of preferably 0.1 to 30 wt.%.

The treating liquid of the present invention is also useful as wetting solution at the time of offset printing. On this occasion, the treating liquid is diluted with water of 1 to 10 times the quantity thereof.

DESCRIPTION OF THE PREFERRED EMBODIMENTS

EXAMPLE 1

| | |
|---|---|
| $[Co(NH_3)_6]Cl_3$ | 50 g |
| water | 1000 ml |

EXAMPLE 2

| | |
|---|---|
| $[Fe(NH_3)_6]I_2$ | 30 g |
| water | 1000 ml |

-continued

EXAMPLE 3

| | |
|---|---|
| $[Ti(NH_3)_4Cl_2]Cl$ | 10 g |
| water | 1000 ml |

EXAMPLE 4

| | |
|---|---|
| $[Mn(NH_3)_6]Cl_2$ | 10 g |
| water | 1000 ml |

EXAMPLE 5

| | |
|---|---|
| $[Co(NH_3)_5H_2O]Br_3$ | 10 g |
| water | 1000 ml |

EXAMPLE 6

| | |
|---|---|
| $[Ru(NH_3)_6]_2(SO_4)_3$-$5H_2O$ | 20 g |
| water | 1000 ml |

EXAMPLE 7

| | |
|---|---|
| $\{CU[H_2N(CH_2)_2NH_2]_3\}Cl_3$ | 5 g |
| water | 1000 ml |

EXAMPLE 8

| | |
|---|---|
| $[Pt(NH_3)_6](OH)_4$ | 20 g |
| water | 1000 ml |

EXAMPLE 9

| | |
|---|---|
| $[Ni(NH_3)_6]$ $(ClO_3)_2$ | 2 g |
| water | 1000 ml |

EXAMPLE 10

After adding 60 g of $(NH_4)_2HPO_4$ to the prescription in Example 1, by further adding citric acid thereto, the pH value was adjusted to be 5.0.

EXAMPLE 11

After adding 60 g of glycerine and 1 g of sodium dehydroacetate to the prescription in Example 2, by further adding malonic acid thereto, the pH value was adjusted to be 6.0.

EXAMPLE 12

| | |
|---|---|
| $[Co(NH_3)_4Cl_2]Cl$ | 2 g |
| $Na_2PO_4$ | 20 g |
| water | 1000 ml |

EXAMPLE 13

| | |
|---|---|
| $[Fe(NH_3)_5NO_2]Cl_2$ | 5 g |
| $NH_4H_2PO_4$ | 30 g |
| adipic acid | 10 g |
| water | 1000 ml |

EXAMPLE 14

| | |
|---|---|
| $[Co(NH_3)_5(OH_2)](C_2O_4)_{1.5} \cdot 2H_2O$ | 5 g |
| tartaric acid | 10 g |
| water | 1000 ml |

EXAMPLE 15

| | |
|---|---|
| $[Ni(NH_3)_6](ClO_3)_2$ | 5 g |
| water | 1000 ml |

EXAMPLE 16

| | |
|---|---|
| $[Co(NH_3)_4(NO_2)_2]Cl$ | 5 g |
| sodium dehydroacetate | 1 g |
| glycolic acid | 10 g |
| water | 1000 ml |

EXAMPLE 17

After adding 50 g of $Na_3PO_4$ to the prescription of Example 3, by further adding phosphoric acid thereto, the pH value was adjusted to be 9.0.

EXAMPLE 18

After adding 40 g of $(NH_4)_2HPO_4$ to the prescription in Example 8, by further adding succinic acid thereto, the pH value was adjusted to be 4.5.

EXAMPLE 19

After adding 10 g of methacrylic acid polymer to the prescription in Example 5, by further adding tartaric acid thereto, the pH value was adjusted to be 4.0.

COMPARATIVE EXAMPLE 1

| | |
|---|---|
| sodium ferrocyanate | 40 g |
| diammonium phosphate | 20 g |
| water | 1000 ml |

By adding citric acid to the above prescription, the pH value was adjusted to be 5.0.

COMPARATIVE EXAMPLE 2

| | |
|---|---|
| phytic acid | 50 g |
| gum arabic | 1 g |
| water | 1000 ml |

By adding NaOH to the above prescription, the pH value was adjusted to be 5.0.

COMPARATIVE EXAMPLE 3

| | |
|---|---|
| tannic acid | 20 g |
| water | 1000 ml |

By adding NaOH to the above prescription, the pH value was adjusted to be 5.0.

COMPARATIVE EXAMPLE 4

| | |
|---|---|
| monocalcium salt of phytic acid | 40 g |
| phosphoric acid | 65 g |
| NaOH | 50 g |
| water | 1000 ml |

Next, after applying the respective treating liquids obtained as above to a commercial electrophotographic type-lithographic master prepared through the desensitizing process at a freed rate of 50 mm/sec. by means of RICOH ETCHING PROCESSOR, the manufacture of K. K. RICOH, offset printing was conducted. In this context, water was employed as wetting solution.

The result was as shown in the following table-1, respectively.

Table 1

| | Occurrence of stains of gear-stripe in printing | Condition of lithographic plate after turning out 5,000 prints. | 85 lines/inch, 10-gradation reproducibility when 1,000 prints were turned out. |
|---|---|---|---|
| Example 1 | No occurrence when 5,000 prints were turned out. | No stains at all. | 8 |
| Example 2 | No occurrence when 5,000 prints were turned out. | " | " |
| Example 3 | No occurrence when 5,000 prints were turned out. | " | " |
| Example 4 | No occurrence when 5,000 prints were turned out. | " | " |
| Example 5 | No occurrence when 5,000 prints were turned out. | " | " |
| Example 6 | No occurrence when 5,000 prints were turned out. | " | " |
| Example 7 | No occurrence when 5,000 prints were turned out. | " | " |
| Example 8 | No occurrence when 5,000 prints were turned out. | " | " |
| Example 9 | No occurrence when 5,000 prints were turned out | " | " |
| Example 10 | No occurrence when 10,000 prints were turned out. | " | 9 |
| Example 11 | No occurrence when 10,000 prints were turned out. | " | " |
| Example 12 | No occurrence when 15,000 | " | " |

Table 1-continued

| | Occurrence of stains of gear-stripe in printing | Condition of lithographic plate after turning out 5,000 prints. | 85 lines/inch, 10-gradation reproducibility when 1,000 prints were turned out. |
|---|---|---|---|
| | prints were turned out. | | |
| Example 13 | No occurrence when 15,000 prints were turned out. | " | 9 |
| Example 14 | No occurrence when 10,000 prints were turned out. | " | " |
| Example 15 | No occurrence when 5,000 prints were turned out. | " | 8 |
| Example 16 | No occurrence when 5,000 prints were turned out. | " | " |
| Example 17 | No occurrence when 15,000 prints were turned out. | " | 9 |
| Example 18 | No occurrence when 15,000 prints were turned out. | " | " |
| Example 19 | No occurrence when 10,000 prints were turned out. | " | " |
| Comparative Example 1 | Stains occurred upon turning out 1,000 prints. | Stains on the coarsened surface | 8 |
| Comparative Example 2 | Stains occurred upon turning out 50 prints. | Stains on the whole surface, as well as the coarsened surface | 7 |
| Comparative Example 3 | Stains occurred upon turning out 300 prints. | No stains, but remarkable collapse of image. | 4 |
| Comparative Example 4 | Stains occurred upon turning out 300 prints. | Stains on the coarsened surface | 5 |

EXAMPLE 20

| | |
|---|---|
| $K[Co(NH_3)_2(NO_2)_4]$ | 30 g |
| water | 1000 ml |

By adding tartaric acid to the above prescription, the pH value was adjusted to be 5.0.

EXAMPLE 21

| | |
|---|---|
| $Na[Co(NH_3)_2(NO_2)(C_2O_4)]$ | 40 g |
| water | 1000 ml |

By adding phosphoric acid to the above prescription, the pH value was adjusted to be 4.5.

EXAMPLE 22

| | |
|---|---|
| $K_3[Co(C_2O_4)_3]$ | 20 g |
| $(NH_4)_2HPO_4$ | 20 g |
| water | 1000 ml |

By adding citric acid to the above prescription, the pH value was adjusted to be 4.5.

EXAMPLE 23

| | |
|---|---|
| K[Co(edta)] | 30 g |
| CMC | 2 g |
| water | 1000 ml |

By adding adipic acid to the above prescription, the pH value was adjusted to be 4.5.

EXAMPLE 24

| | |
|---|---|
| $K_3[Ni(C_2O_4)_3]$ | 25 g |
| $NH_4H_2PO_4$ | 10 g |
| water | 1000 ml |

By adding malic acid to the above prescription, the pH value was adjusted to be 5.0.

EXAMPLE 25

| | |
|---|---|
| Na[Fe(edta)] | 20 g |
| alginic acid | 5 g |
| water | 1000 ml |

By adding malonic acid to the above prescription, the pH value was adjusted to be 5.0.

Next, absorbent cotton was soaked with the respective treating liquids obtained as above, and by the use of the thus soaked cotton, a commercial zinc oxide-resin dispersion type electrophotographic printing plate prepared through electrophotographic process was desensitized and then served for printing. In this context, as the wetting solution, a solution obtained by diluting the respective treating liquids with water to increase five-fold was employed. The result was as shown in the following table 2.

Table 2

| | Occurrence of stains of gear-stripe in printing | 85 lines/inch, 10-gradation reproducibility when 1,000 prints were turned out. |
|---|---|---|
| Example 20 | No occurrence when 10,000 prints were turned out. | 9 |
| Example 21 | No occurrence when 15,000 prints were turned out. | " |
| Example 22 | No occurrence when 15,000 prints were turned out. | " |
| Example 23 | No occurrence when 10,000 prints were turned out. | " |
| Example 24 | No occurrence when 15,000 prints were turned out. | " |
| Example 25 | No occurrence when 10,000 prints were | " |

Table 2-continued

| Occurrence of stains of gear-stripe in printing | 85 lines/inch, 10-gradation reproducibility when 1,000 prints were turned out. |
|---|---|
| turned out. | |

EXAMPLE 26

| | |
|---|---|
| $[Co(NH_2)_6Cl_3$ | 50 g |
| diammonium phosphate | 100 g |
| water | 1000 ml |

By adding malonic acid to the above prescription, the pH value was adjusted to be 5.0.

EXAMPLE 27

By adding malic acid in place of malonic acid to the prescription in Example 26, the pH value was adjusted to be 5.0.

EXAMPLE 28

| | |
|---|---|
| $[Co(NH_3)_6]\ (CClO_4)_3$ | 50 g |
| disodium phosphate | 10 g |
| water | 1000 ml |

The pH value of the solution was 8.4.

EXAMPLE 29

By adding citric acid in place of malonic acid in Example 26, the pH value was adjusted to be 6.0.

EXAMPLE 30

| | |
|---|---|
| $[Co(NH_3)_6(NO_3)_3$ | 50 g |
| metaphosphoric acid | 50 g |
| water | 1000 ml |

EXAMPLE 31

| | |
|---|---|
| $[Co(NH_3)_6](CF_3COO)_3$ | 20 g |
| monoammonium phosphate | 50 g |
| water | 1000 ml |

EXAMPLE 32

| | |
|---|---|
| $[Co(NH_3)_6]SO_4$ | 50 g |
| molybdenum phosphate | 100 g |
| water | 1000 ml |

EXAMPLE 33

| | |
|---|---|
| $[Co(NH_3)_6](OH)_2.6H_2O$ | 30 g |
| hexaphosphoric acid | 60 g |
| water | 1000 ml |

EXAMPLE 34

-continued

| | |
|---|---|
| $[Co(NH_3)_6](HPO_4)_3.4H_2O$ | 50 g |
| phosphoric acid | 60 g |
| water | 1000 ml |

EXAMPLE 35

By adding caustic soda to the solution in Example 34, the pH value was adjusted to be 4.5.

EXAMPLE 36

| | |
|---|---|
| $[Co(NH_3)_6]I_3$ | 50 g |
| monomagnesium phosphate | 50 g |
| water | 1000 ml |

EXAMPLE 37

50 g of phytic acid were added to the solution in Example 26.

EXAMPLE 38

1 g of sodium dehydroacetate was added to the solution in Example 26.

EXAMPLE 39

1 g of EDTA was added to the solution in Example 26.

EXAMPLE 40

50 glycerine were added to the solution in Example 26.

EXAMPLE 41

| | |
|---|---|
| $[Ni(NH_3)_6]Cl_3$ | 10 g |
| $[Co(NH_3)_5(OH_2)]\ (C_2O_4)_{1.5}\cdot 2H_2O$ | 10 g |
| $(NH_4)_2HPO_4$ | 30 g |
| malonic acid | 20 g |
| water | 1000 ml |

EXAMPLE 42

| | |
|---|---|
| $[FE(NH_3)_5NO_2]Cl_2$ | 10 g |
| $Na[Co(NH_3)_2(NO_2)\ (C_2O_4)]$ | 10 g |
| $Na_2HPO_4$ | 30 g |
| citric acid | 20 g |
| water | 1000 ml |

EXAMPLE 43

| | |
|---|---|
| $[Co(NH_3)_4(NO_2)_2]Cl$ | 10 g |
| $K[Co(NH_3)_2(NO_2)_4]$ | 10 g |
| $H_3PO_4$ | 30 g |
| NaOH | 10 g |
| water | 1000 ml |

COMPARATIVE EXAMPLE 5

| | |
|---|---|
| sodium ferrocyanate | 50 g |
| diammonium phosphate | 50 g |
| water | 1000 ml |

By adding malonic acid to a solution prescribed as above, the pH value was adjusted to be 5.0.

When a variety of electrophotographic offset masters prepared through the desensitizing process by employing the respective treating liquids obtained as above and a direct image-printing type offset master (which was prepared by typewriting with a typewriter and thereafter drawing with a sign-pen charged with oily ink, a ball-point pen and an HB pencil) were subjected to etching and then served for offset printing while employing water as wetting solution, the result was as shown in the following table 3, respectively.

Table 3

| | Occurrence of stains of gear-stripe in printing | 85 lines/inch, 10-gradation reproducibility when 1,000 prints were turned out. |
|---|---|---|
| Example 26 | No occurrence when 15,000 prints were turned out. | 9 |
| Example 27 | No occurrence when 15,000 prints were turned out. | " |
| Example 28 | No occurrence when 15,000 prints were turned out. | " |
| Example 29 | No occurrence when 15,000 prints were turned out. | " |
| Example 30 | No occurrence when 15,000 prints were turned out. | " |
| Example 31 | No occurrence when 15,000 prints were turned out. | " |
| Example 32 | No occurrence when 15,000 prints were turned out. | " |
| Example 33 | No occurrence when 15,000 prints were turned out. | " |
| Example 34 | No occurrence when 15,000 prints were turned out. | " |
| Example 35 | No occurrence when 15,000 prints were turned out. | " |
| Example 36 | No occurrence when 15,000 prints were turned out. | " |
| Example 37 | No occurrence when 15,000 prints were turned out. | " |
| Example 38 | No occurrence when 15,000 prints were turned out. | |
| Example 39 | No occurrence when 15,000 prints were turned out. | " |
| Example 40 | No occurrence wnen 15,000 prints were turned out. | " |
| Example 41 | No occurrence when 15,000 prints were turned out. | " |
| Example 42 | No occurrence when 15,000 prints were turned out. | " |
| Example 43 | No occurrence when 15,000 prints were turned out. | " |
| Example 1* | No occurrence when 3,000 prints were turned out. | " |

Table 3-continued

| | Occurrence of stains of gear-stripe in printing | 85 lines/inch, 10-gradation reproducibility when 1,000 prints were turned out. |
|---|---|---|
| Example 2* | No occurrence when 3,000 prints were turned out. | " |
| Example 5* | No occurrence when 3,000 prints were turned out. | " |
| Example 6* | No occurrence when 3,000 prints were turned out. | " |
| Comparative Example 5 | Stains occurred upon turning out 1,000 prints | 8 |
| Comparative Example 5* | Stains occurred upon turning out 100 prints | " |

*A direct image-printing type offset master was used. In other examples, an electrophotographic offset master was used.

**Reproducibility evaluated by a means for judging the reproducibility which comprises forming a toner image of 85 lines per inch on a zinc oxide-resin dispersion type electrophotographic printing plate in 10-gradation density, performing etching on the plate and then serving the thus processed plate for printing, thereby judgingthe degree of fidelity of the reproduced image. When the value is 8 or more, the reproducibility is good, and when it is less than 8, the reproducibility is poor.

What is claimed is:

1. An aqueous treating composition, comprising water containing an effective amount of at least one complex for desensitizing an offset printing plate and forming a hydrophilic film on the nonimage area thereof, said complex being selected from the group consisting of compounds having the formula I $[M(X_1)_a](Y)_b.cH_2O$, wherein M is cobalt, $X_1$ is $NH_3$, Y is an anion, "a" is 6, "b" is a number in the range of from 1 to 3, and "c" is 0 or a number in the range of from 1 to 10, the concentration of said complex being in the range of 0.1 to 30 weight percent, and at least one assistant selected from the group consisting of phosphates and phosphoric acids, the amount of said assistant being in the range of from 0.1 to 20 parts by weight, per one part by weight of said complex.

2. An aqueous treating composition according to claim 1, wherein said complex is selected from the group consisting of $[Co(NH_3)_6]Cl_3$, $[Co(NH_3)_6](HPO_4)_3.4H_2O$, $[Co(NH_3)_6]PO_4.4H_2O$, $[Co(NH_3)_6].(ClO_4)_3$, $[Co(NH_3)_6](OH)_3.6H_2O$, $[Co(NH_3)_6]SO_4$, $[Co(NH_3)_6]Br$, $[Co(NH_3)_6](NO_3)_3$, $[Co(NH_3)_6]I_3$, $[Co(NH_3)_6]F_3$, $[Co(NH_3)_6](CF_3COO)_3$, $[Co(NH_3)_6](CCl_3COO)_3$, $[Co(NH_3)_6](ClO_3)_3$, $[Co(NH_3)_6]SO_4Cl$, $[Co(NH_3)_6](TiCl_6)$ and $[Co(NH_3)_6](BiCl_6)$.

3. An aqueous treating composition according to claim 1, diluted with water in an amount 1 to 10 times the quantity thereof.

4. An aqueous treating composition according to claim 2, wherein said assistant is selected from the group consisting of phosphoric acid, metaphosphoric acid, hexaphosphoric acid, trimetaphosphoric acid, dodecaoxo-6-phosphoric acid, hypophosphoric acid, monoammonium phosphate, diammonium phosphate, triammonium phosphate, monosodium phosphate, disodium phosphate, trisodium phosphate, monopotassium phosphate, dipotassium phosphate, tripotassium phosphate, phosphomolybdic acid, sodium pyrophosphate, ammonium phosphomolybdate, monocalcium phosphate, monomagnesium phosphate, sodium ammonium phosphate, imidometaphosphoric acid, calcium pyrophosphate and molybdenum phosphate.

* * * * *